US011140088B2

(12) United States Patent
Jokinen et al.

(10) Patent No.: US 11,140,088 B2
(45) Date of Patent: Oct. 5, 2021

(54) NETWORK ELEMENT AND A CONTROLLER FOR A DATA TRANSFER NETWORK

(71) Applicant: CORIANT OY, Espoo (FI)

(72) Inventors: Hannu Jokinen, Espoo (FI); Vesa Kaivosoja, Espoo (FI)

(73) Assignee: Coriant Oy

( * ) Notice: Subject to any disclaimer, the term of this patent is extended or adjusted under 35 U.S.C. 154(b) by 0 days.

(21) Appl. No.: 15/552,308

(22) PCT Filed: Feb. 24, 2015

(86) PCT No.: PCT/FI2015/050104
§ 371 (c)(1),
(2) Date: Aug. 21, 2017

(87) PCT Pub. No.: WO2016/135370
PCT Pub. Date: Sep. 1, 2016

(65) Prior Publication Data
US 2018/0241686 A1 Aug. 23, 2018

(51) Int. Cl.
*H04L 12/825* (2013.01)
*H04L 12/801* (2013.01)
*H04L 12/715* (2013.01)

(52) U.S. Cl.
CPC .............. *H04L 47/26* (2013.01); *H04L 47/19* (2013.01); *H04L 45/64* (2013.01)

(58) Field of Classification Search
CPC .......... H04L 47/19; H04L 47/26; H04L 45/64
See application file for complete search history.

(56) References Cited

U.S. PATENT DOCUMENTS

2006/0013125 A1* 1/2006 Vasseur .................. H04L 45/02
370/217
2006/0092935 A1* 5/2006 Lakshman ............. H04L 45/00
370/389
(Continued)

FOREIGN PATENT DOCUMENTS

WO 2014184392 A2 11/2014

OTHER PUBLICATIONS

Oct. 23, 2015, International Search Report for related International Application No. PCT/FI2015/050104.
(Continued)

*Primary Examiner* — Robert C Scheibel (57) ABSTRACT

A network element includes a data transfer interface for connecting to a data transfer network, a data-plane section for managing data to be forwarded, and a control section for configuring the data-plane section in accordance with configuration data carried by control-plane messages received from the data transfer network. The control section controls the data transfer interface to send one or more overload messages to the data transfer network in response to an overload situation where the workload of the control section impairs the ability of the control section to react to the control-plane messages. Thus, other network elements know that the network element that does not respond to the control-plane messages and thus appears to be non-working may still forward data even though its ability to react to the control-plane messages is, at least temporarily, impaired.

23 Claims, 4 Drawing Sheets

(56) References Cited

U.S. PATENT DOCUMENTS

| | | | |
|---|---|---|---|
| 2013/0250763 A1* | 9/2013 | Assarpour | H04L 47/12 370/235 |
| 2014/0241247 A1* | 8/2014 | Kempf | H04L 12/4633 370/328 |
| 2015/0180769 A1* | 6/2015 | Wang | H04L 45/38 370/236 |
| 2017/0118066 A1* | 4/2017 | Mathew | H04L 41/0663 |

OTHER PUBLICATIONS

Chu Liang, et al., Scalable and Crash-Tolerant Load Balancing Based on Switch Migration for Multiple OpenFlow Controllers, 2014 Second International Symposium on Computing and Networking, Dec. 10-12, 2014, pp. 171-177.
Open Networking Foundation, OpenFlow Switch Specification: Version 1.1.0 Implemented (Wire Protocol 0x02), Feb. 28, 2011, pp. 1-56.

* cited by examiner

NETWORK ELEMENT AND A CONTROLLER FOR A DATA TRANSFER NETWORK

FIELD OF THE DISCLOSURE

The disclosure relates generally to managing network elements of a data transfer network. The data transfer network can be, for example but not necessarily, a software-defined network "SDN". More particularly, the disclosure relates to a network element of a data transfer network. Furthermore, the disclosure relates to a controller for managing network elements of a data transfer network. Furthermore, the disclosure relates to a method and to a computer program for managing a network element of a data transfer network.

BACKGROUND

A data transfer network is typically arranged to support control-plane and data-plane functionalities. The data-plane functionalities comprise managing data traffic at network elements of the data transfer network so that the network elements operate as parts of the data transfer network. The control-plane functionalities comprise configuring the data-plane functionalities to the network elements. Furthermore, the control-plane functionalities may comprise for example collecting statistics, forwarding alarms, monitoring link states, and/or other functionalities for managing and/or monitoring the data transfer network. Each network element can be for example an Internet Protocol "IP" router, a multiprotocol label switching "MPLS" node, a packet optical switch, and/or an Ethernet switch. In a traditional data transfer network, the network elements that forward data traffic are typically configured to support both the data-plane functionalities and the control-plane functionalities. The control-plane functionalities can be implemented for example with interior gateway protocols "IGP" such as e.g. Open Shortest Path First "OSPF", Routing Information Protocol version 2 "RIPv2", and Intermediate System to Intermediate System protocol, and with exterior gateway protocols "EGP" such as e.g. the Border Gateway Protocol "BGP". In a software-defined network "SDN", the control-plane is separated from the data-plane so that the control-plane is implemented in one or more controllers that can be separate from the data-forwarding network elements and the data-plane is implemented in the data-forwarding network elements.

The data-plane and control-plane functionalities are typically defined in technical specifications produced and maintained by standardizations bodies such as e.g. the Internet Engineering Task Force "IETF". Technical specifications which define the control-plane functionalities do not usually, however, define overload protection mechanisms related to the control-plane. Basic assumption is that overload mechanisms are not needed because control-plane messages, i.e. messages related to the control-plane, have highest priority when being managed on the data-plane. However, in certain situations, a central processing unit "CPU" and/or memory capacity of a network element can be loaded so heavily that the network element is not able to react to all control-plane messages received at the network element, at least not on-time. This, in turn, may lead to a situation where other network elements deem the overloaded network element to be non-working and thus the other network elements may carry out re-routing so that the overloaded network element is bypassed. For example, if a network element does not respond to an Intermediate System to Intermediate System protocol hello-message within a pre-determined time, another network element which has sent the above-mentioned hello-message deems that the first mentioned network element is down, i.e. non-working. This may waste the capacity of the data transfer network because the overloaded network element could, in spite of the overload related to the control-plane, forward data in accordance with the data-plane.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new network element that can be, for example but not necessarily, an Internet Protocol "IP" router, a multiprotocol label switching "MPLS" switch, a packet optical switch, and/or an Ethernet switch. The network element can be a single apparatus or a combination of a plurality of apparatuses capable of communicating with each other.

A network element according to the invention comprises:
- a data transfer interface for connecting to a data transfer network,
- a data-plane section for managing data to be forwarded, and
- a control section for configuring the data-plane section in accordance with configuration data carried by control-plane messages received from the data transfer network, the configured data-plane section enabling the network element to operate as a part of the data transfer network.

The control section is adapted to control the data transfer interface to send one or more overload messages to the data transfer network in response to an overload situation in which the workload of the control section impairs the ability of the control section to react to the control-plane messages.

The above-mentioned data transfer network can be, for example but not necessarily, a software-defined network "SDN" where the control-plane is separated from the data-plane so that the control-plane is implemented in one or more controllers that can be separate from the above-mentioned network element and other data-forwarding network elements of the software-defined network and the data-plane is implemented in the data-forwarding network elements.

The above-mentioned one or more overload messages indicate that the network element, i.e. the overloaded network element, is still working but its ability to react to the control-plane messages is, at least temporarily, impaired. Thus, one or more other elements of the data transfer network are made aware of that the overloaded network element that may appear to be non-working is still working even though its ability to react to the control-plane messages is, at least temporarily, impaired. The ability of the overloaded network element to react to the control-plane messages can be impaired e.g. so that it takes more time than normally to react to the control-plane messages or so that the overloaded network element is totally incapable of reacting to the control-plane messages.

In some exemplifying and non-limiting cases, an operator and/or a network management system may have pre-planned network designs for overload situations of the kind mentioned above. This may mean for example that some of network elements connected to the overloaded network element stop or reduce control-plane related cooperation with the overloaded network element but other ones of the connected network elements continue the control-plane related cooperation with the overloaded network element. For example, if the overloaded network element has many interior gateway protocol "IGP", e.g. OSPF, neighbors and the overloaded network element informs the neighbors about the overload situation, the data transfer network can be re-configured to have two or more sub-networks so that the number of the IGP-neighbors of the overloaded network element is reduced. Once the overload situation is over, the data transfer network can be re-configured according to the original network design. The above-described approach can be deployed also in a software-defined network "SDN" through an SDN-controller. In this exemplifying and non-limiting case, the overloaded network element informs the SDN-controller about the overload situation and the SDN-controller configures other network elements so that the two or more sub-networks are formed and thereby the number of the IGP-neighbors of the overloaded network element is reduced.

In accordance with the invention, there is provided also a new controller for configuring network elements of a data transfer network, e.g. a software-defined network "SDN". The controller can be a part of a controller system constituted by many controllers of the data transfer network. It is also possible that the controller alone constitutes the controller system of the data transfer network. Furthermore, the controller can be a single apparatus or a combination of a plurality of apparatuses capable of communicating with each other.

A controller according to the invention comprises:
- a control-plane section for composing control-plane messages carrying configuration data enabling a control section of each of the network elements to configure a data-plane section of the network element, the configured data-plane section enabling the network element to manage data to be forwarded, and
- a data transfer interface for transmitting the control-plane messages to the network elements.

The control-plane section is adapted to carry out, in response to a reception of an overload message from one of the network elements, one or more pre-determined actions for reducing amount of such ones of the control-plane messages which request the control section of the one of the network elements to react.

The above-mentioned one or more pre-determined actions may comprises for example treating the data-plane section of the one of the network elements as unchangeable when configuring other ones of the network elements and/or dividing a sub-network constituting an interior gateway protocol "IGP" area and comprising the one of the network elements into smaller subnetworks constituting separate IGP-areas.

In accordance with the invention, there is provided also a new method for managing a network element that comprises:
- a data transfer interface for connecting to a data transfer network,
- a data-plane section for managing data to be forwarded, and
- a control section for configuring the data-plane section in accordance with configuration data carried by control-plane messages received from the data transfer network, the configured data-plane section enabling the network element to operate as a part of the data transfer network.

A method according to the invention comprises controlling the data transfer interface to send one or more overload messages to the data transfer network in response to an overload situation in which the workload of the control section impairs the ability of the control section to react to the control-plane messages.

In accordance with the invention, there is provided also a new computer program for managing a network element of the kind mentioned above.

A computer program according to the invention comprises computer executable instructions for controlling a programmable processing system of the network element to control the data transfer interface of the network element to send one or more overload messages to the data transfer network in response to an overload situation in which the workload of the control section of the network element impairs the ability of the control section to react to control-plane messages.

In accordance with the invention, there is provided also a new computer program product. The computer program product comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below with reference to the accompanying drawings, in which.

DESCRIPTION OF EXEMPLIFYING AND NON-LIMITING EMBODIMENTS

Figure 1:
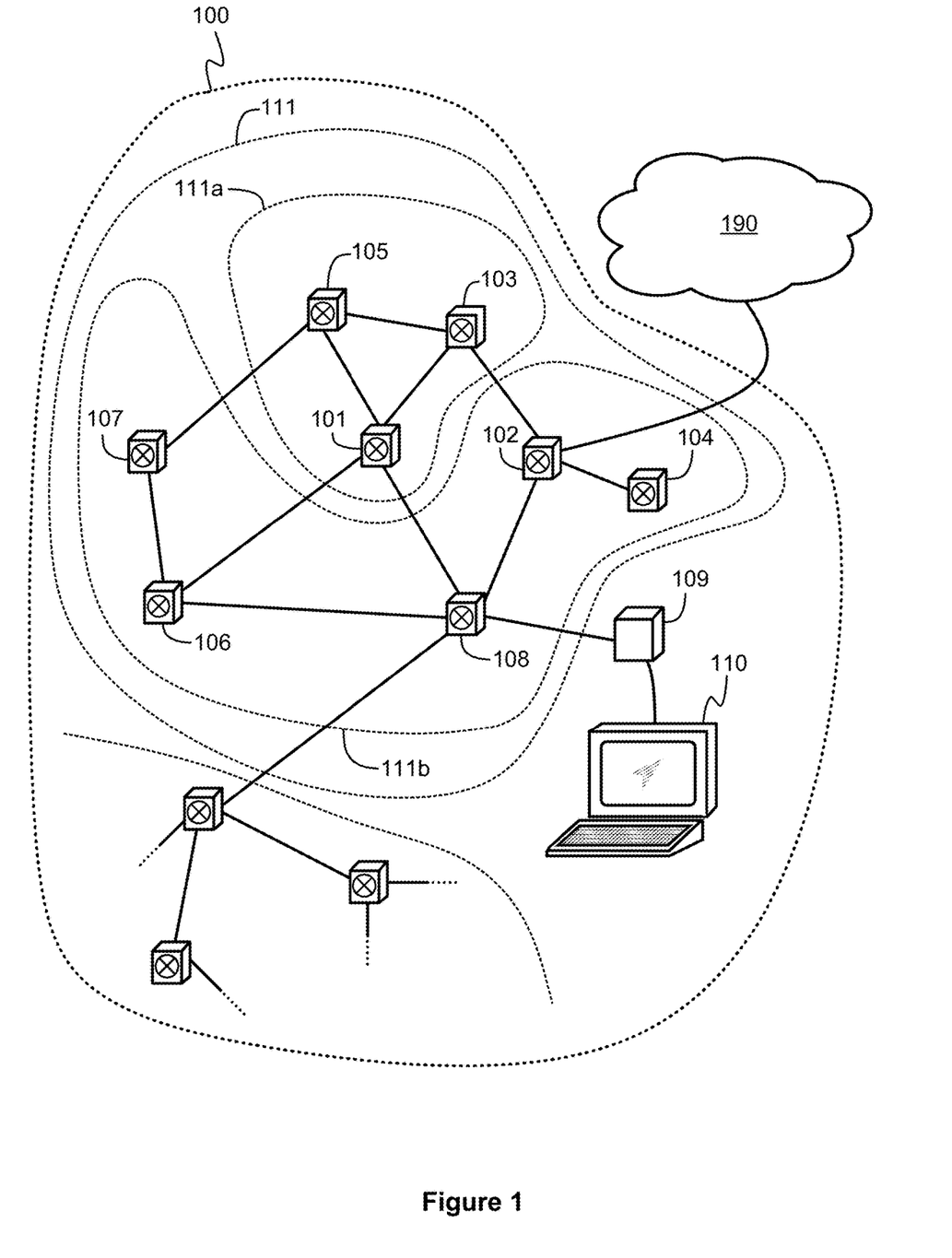
FIG. 1 shows a schematic illustration of an exemplifying data transfer network comprising at least one network element according to an exemplifying and non-limiting embodiment of the invention.

FIG. 1 shows a schematic illustration of an exemplifying data transfer network 100. The data transfer network comprises, among others, network elements 101, 102, 103, 104, 105, 106, 107, and 108. The network elements 101-108 of this exemplifying data transfer network are mutually interconnected with data transfer links as illustrated in FIG. 1. The network element 102 acts as a gateway to an external network 190 that can be e.g. the global Internet. Furthermore, the exemplifying data transfer network 100 comprises other network elements all of which are not shown in FIG. 1. Each of the network elements may be e.g. an Internet Protocol "IP" router, a multiprotocol label switching "MPLS" node, a packet optical switch, and/or an Ethernet switch. Each network element may consist of a single apparatus or a combination of a plurality of apparatuses. Each of the network elements comprises a data-plane section for managing data to be forwarded and a control section for configuring the data-plane section in accordance with configuration data carried by control-plane messages received at the network element. The configured data-plane section enables the network element under consideration to operate as a part of the data transfer network 100. The data-plane section and the control section are implemented with a processing system and memory capacity of the network element under consideration. The processing system may comprise e.g. a central processor unit "CPU" for running the control-plane functionalities and one or more other processors, such as e.g. network processors "NP", for running the data-plane functionalities.

Without limiting the generality and merely for illustrative purposes, we consider the operation of the network element 101 in an exemplifying situation where the workload of the control section of the network element 101 impairs the ability of the control section to react to control-plane messages received at the network element 101. This overload situation can be e.g. such that the central processing unit "CPU" and/or the memory capacity of the network element 101 is/are loaded so heavily that the network element 101 is not able to react to all control-plane messages received at the network element 101, at least not on-time. The ability to react to the control-plane messages can be impaired for example so that the ability to modify the configuration of the data-plane section of the network element 101 is impaired, e.g. the ability to modify a routing table, access control lists, and/or other entities related to the data-plane section can be impaired.

In an overload situation of the kind described above, the network element 101 sends one or more overload messages in order to inform one or more other elements of the data transfer network 100 that the network element 101 is working even though its ability to react to the control-plane messages is, at least temporarily, impaired. The purpose of the one or more overload messages is to avoid a situation where the other network elements deem the network element 101 to be totally non-working. The network element 101 can be adapted to send one or more back-to-normal messages in response to the ending of the overload situation so as to inform one or more other elements of the data transfer network 100 that the network element 101 is working normally again. It is also possible that the network element 101 forms an estimate for a temporal duration of the overload situation and sets each overload message to carry information indicative of the estimate.

The estimate of the temporal duration can be based on e.g. the number of tasks queuing for the control section and on task-specific estimates of processing time needed for each task. The tasks may comprise e.g. calculations related to one or more routing protocols, collecting statistics, monitoring link states, etc. Tasks of the kind mentioned above are typically software-implemented, but in principle it is also possible that one or more tasks are carried out with one or more dedicated hardware circuits. The estimate of the temporal duration of the overload situation enables the one or more other elements of the data transfer network 100 to assess when the network element 101 works normally again. The network element 101 can be adapted to keep its data-plane section unchanged during the overload situation. In this exemplifying case, the network element 101 can forward data during the overload situation but the routes defined by the data-plane section of the network element 101 are deemed to be unchangeable during to overload situation, i.e. as if these routes were static routes.

In an exemplifying and non-limiting case, the network element 101 is adapted to set each overload message to carry information that is indicative of one or more reasons for the overload situation. This information may contain for example a first data item expressing that the processing capacity of the control section is occupied, a second data item expressing that free memory capacity of the control section is below a pre-determined limit, and/or a third data item identifying one or more tasks being done by the control section and causing the overload situation. The identified tasks may comprise for example calculations related to one or more routing protocols, collecting statistics, monitoring link states, etc. Based on the information indicative of the one or more reasons, one or more other elements of the data transfer network 100 may decide how to react to the overload situation of the network element 101. The operation of the one or more other elements can be at least partly dependent on the reason of the overload situation. For example, the operation of the one or more other elements can be different in an exemplifying case where calculations related to one or more routing protocols have caused the overload situation than in another exemplifying case where collecting statistics has caused the overload situation.

In an exemplifying and non-limiting case, the network element 101 is adapted to run one or more routing protocols with one or more other network elements of the data transfer network 100 and to configure the data-plane section in accordance with routing protocol messages received from the one or more other network elements. The one or more routing protocols may comprise for example an interior gateway protocol "IGP" such as e.g. Open Shortest Path First "OSPF", Routing Information Protocol version 2 "RIPv2", and Intermediate System to Intermediate System protocol, and an exterior gateway protocols "EGP" such as e.g. the Border Gateway Protocol "BGP". In this exemplifying case, the network element 101 is adapted to send the overload messages to the one or more other network elements in response to the overload situation.

An operator and/or a network management system "NMS" of the data transfer network 100 may have pre-planned network designs for overload situations of the kind described above. Without limiting the generality and merely for illustrative purposes, we consider an exemplifying situation where the network element 101 sends overload messages to its neighbors and where the network elements 101-108 initially belong to a sub-network 111 which constitutes an interior gateway protocol "IGP" area, e.g. an autonomous system AS" of an Internet Protocol "IP" network. In the initial situation, the network elements 103, 105, 106, and 108 are IGP-neighbors of the network element 101 which informs about the overload situation, i.e. the network element 101 has four IGP-neighbors. In response to the overload situation of the network element 101, the data transfer network 100 can be re-configured to have sub-networks 111*a* and 111*b* which constitute separate IGP-areas so that the number of the IGP-neighbors of the network element 101 is reduced. After the reconfiguration, the network elements 103 and 105 are the IGP-neighbors of the network element 101, i.e. the network element 101 has two IGP-neighbors. Once the overload situation is over, the data transfer network 101 can be re-configured according to the original network design, i.e. to have to the original sub-network 111 which constitutes a single interior gateway IGP-area.

In an exemplifying and non-limiting case, the network elements 101-108 are parts of a software-defined network "SDN", where the control-plane is separated from the data-plane so that the control-plane is implemented in one or more controllers that can be separate from the network elements 101-108 and the data-plane is implemented in the network elements. In the exemplifying case illustrated in FIG. 1, the data transfer network 100 comprises a controller 109 that can be a part of a controller system constituted by many controllers of the software-defined network. It is also possible that the controller 109 alone constitutes the controller system of the software-defined network. Furthermore, the controller 109 can be a single apparatus or a combination of a plurality of apparatuses capable of communicating with each other. In the exemplifying case illustrated in FIG. 1, the controller 109 is connected with a data transfer link to the network element 108 and a user interface device 110 is connected to the controller. It is to be noted that the controller 109 or one or more parts of it can also act as a network element that can be e.g. an Internet Protocol "IP" router, a multiprotocol label switching "MPLS" switch, a packet optical switch, and/or an Ethernet switch.

The controller 109 is adapted to run with each of the network elements 101-108 a configuration protocol supporting the software-defined networking. Each network element is adapted to configure the data-plane section of the network element under consideration in accordance with configuration data carried by configuration messages received from the controller 109. The configuration protocol can be for example the OpenFlow or some other suitable configuration protocol in order to transfer the configuration data from the controller 109 to the network elements. More details about the above-mentioned OpenFlow can be found from the "OpenFlow Switch Specification" managed by the Open Networking Foundation "ONF". The configured data-plane section of each network element may comprise for example a system of interconnected look-up tables defining actions to be carried out in different operational situations. The look-up tables may include for example one or more successive flow tables and a group table. Each flow table contains a set of flow entries. Each flow entry may consist of match fields, counters, and a set of actions to apply to matching data frames. The group table contains group entries, where each group entry may contain a list of actions to be directed to data frames defined to belong to a particular group. An action defined by the configuration data may comprise for example: recording data into a memory, modifying the data, selecting one or more egress ports of the network element and forwarding the data and its possible duplicates to the selected one or more egress ports, selecting one or more look-up tables and executing one or more look-ups from the selected look-up tables, performing arithmetic operations, branching operations, performing logical operations, reading metadata associated with the data being managed, writing metadata associated with the data, modifying metadata associated with the data, dropping the data, and/or duplicating the data.

Without limiting the generality and merely for illustrative purposes, we consider the overload situation of the network element 101. In this case, the network element 101 sends the overload message to the controller 109. Thus, the controller 109 becomes aware of the overload situation and the controller 109 can take actions for reducing amount of such ones of the control-plane messages which request the control section of the network element 101 to react. The controller 109 can be adapted to cancel the actions in response to a reception of a back-to-normal message from the network element 101. The overload message may contain information indicative of the estimated duration of the overload situation. In this case, the controller 109 can be adapted to cancel the actions when the estimated duration of the overload situation has elapsed. The overload message may contain information indicative of one or more reasons for the overload situation. In this case, the controller 109 can be adapted to select the one or more actions for responding to the overload situation in accordance with the information indicative of the one or more reasons.

The above-described approach, where the sub-network 111 constituting an IGP-area is divided into sub-networks constituting separate IGP-areas, can be deployed also in the software-defined network through the controller 109. In this case, the controller 109 configures the network elements 102-108 so that the sub-networks 111*a* and 111*b* are formed and thereby the number of the IGP-neighbors of the network element 101 is reduced. Once the overload situation is over, the data transfer network 101 can be re-configured according to the original network design, i.e. to have to the original sub-network 111 which constitutes a single IGP-area.

Figure 2:
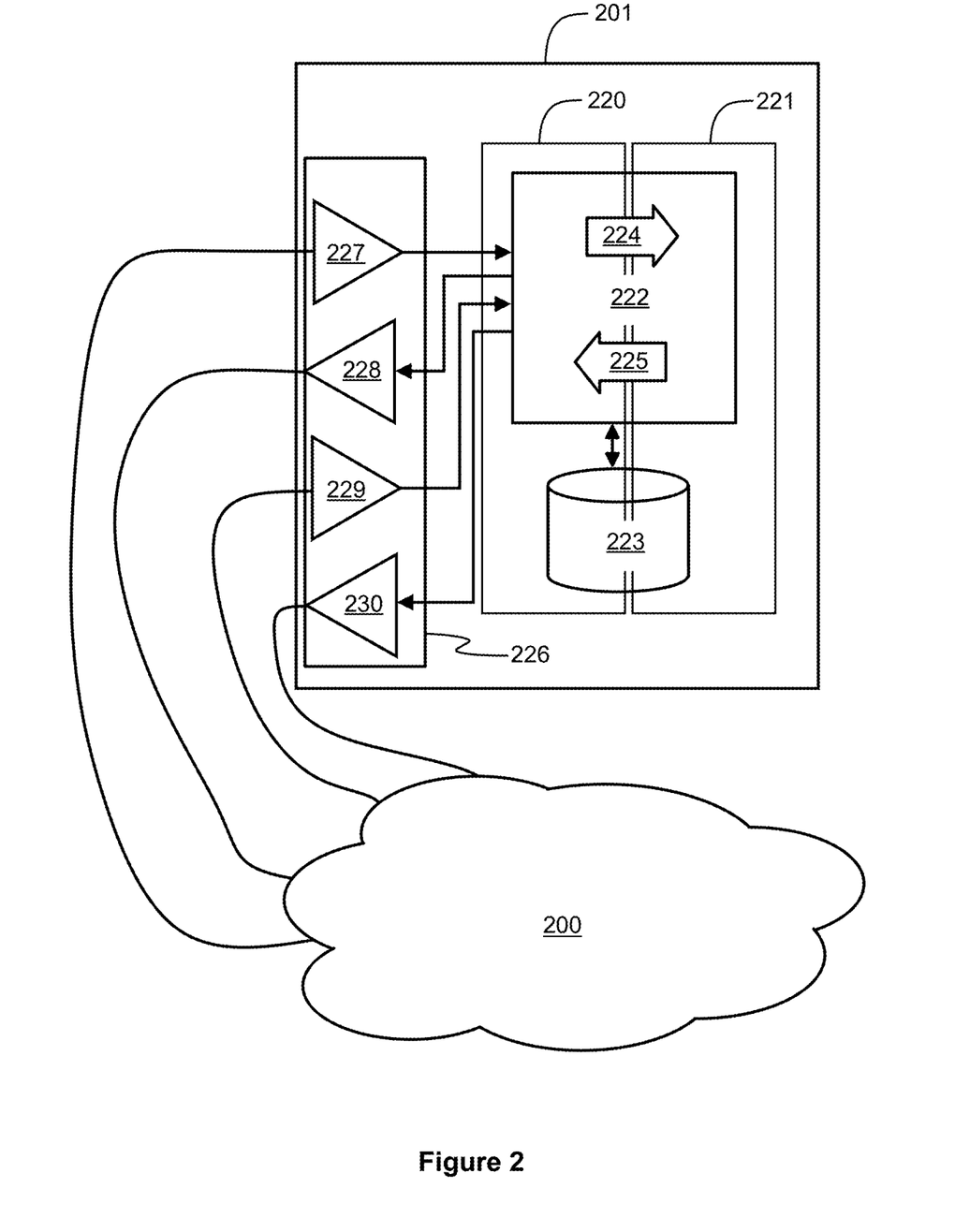
FIG. 2 shows a schematic illustration of a network element according to an exemplifying and non-limiting embodiment of the invention.

FIG. 2 shows a schematic illustration of a network element 201 according to an exemplifying and non-limiting embodiment of the invention. The network element can be, for example, an Internet Protocol "IP" router, a Multiprotocol label switching "MPLS" switch, a packet optical switch, and/or an Ethernet switch. The network element 201 comprises a data transfer interface 226 which comprises ingress ports 227 and 229 and egress ports 228 and 230 for connecting via data transfer links to a data transfer network 200. The network element comprises a processing system 222 and memory 223. The processing system 222 can be implemented with one or more processor circuits, each of which can be a programmable processor circuit provided with appropriate software, a dedicated hardware processor such as for example an application specific integrated circuit "ASIC", or a configurable hardware processor such as for example a field programmable gate array "FPGA". The memory can be implemented with one or more memory devices such as e.g. a random-access-memory "RAM" and/or content addressable memory "CAM". The network element comprises a data-plane section 220 for managing data to be forwarded. The network element comprises a control section 221 for configuring the data-plane section 220 in accordance with configuration data carried by received control-plane messages. The configured data-plane section enables the network element to cooperate with the data transfer network 200. In FIG. 2, an arrow 224 represents the transfer of control-plane related data from the data-plane section 220 to the control section 221 and an arrow 225 represents the configuration actions, e.g. updating a routing table, applied by the control section 221 to the data-plane section 220. The data-plane section 220 and the control section 221 are implemented with the processing system 222 and the memory 223. The processing system 222 may comprise a central processor unit "CPU" for the control section and one or more other processors, such as e.g. network processors "NP", for the data-plane section. The control section 221 is adapted to control the data transfer interface 226 to send one or more overload messages to the data transfer network 200 in response to an overload situation in which the workload of the control section 221 impairs ability of the control section to react to the received control-plane messages. The ability to react to the control-plane messages can be impaired for example so that the ability to modify the configuration of the data-plane section 220 is impaired, e.g. the ability to modify a routing table, access control lists, and/or other entities related to the data-plane section can be impaired.

In a network element according to an exemplifying and non-limiting embodiment of the invention, the control section 221 is adapted to control the data transfer interface 226 to send one or more back-to-normal messages to the data transfer network in response to the ending of the overload situation.

In a network element according to an exemplifying and non-limiting embodiment of the invention, the control section 221 is adapted to form, on the basis of tasks to be done by the control section, an estimate of the temporal duration of the overload situation and to set each overload message to carry information indicative of the estimate.

In a network element according to an exemplifying and non-limiting embodiment of the invention, the control section 221 is adapted to set each overload message to carry information indicative of one or more reasons for the overload situation. This information may contain for example a first data item expressing that the processing capacity of the control section 221 is occupied, a second data item expressing that free memory capacity of the control section is below a pre-determined limit, and/or a third data item identifying one or more tasks being done by the control section and causing the overload situation.

In a network element according to an exemplifying and non-limiting embodiment of the invention, the control section 221 is adapted to keep the data-plane section 220, e.g. a routing table, unchanged during the overload situation.

In a network element according to an exemplifying and non-limiting embodiment of the invention, the control section 221 is adapted to run one or more routing protocols, e.g. OSPF, with one or more other network elements. The control section 221 is adapted to configure the data-plane section 220 in accordance with routing protocol messages representing the configuration data and received from the one or more other network elements. In this case, the control section 221 is advantageously adapted to control the data transfer interface 226 to send the one or more overload messages to the one or more other network elements in response to the overload situation.

In a network element according to an exemplifying and non-limiting embodiment of the invention, the control section 221 is adapted to run, with one or more controllers, a configuration protocol, e.g. OpenFlow, supporting the software-defined networking. The control section 221 is adapted to configure the data-plane section in accordance with the configuration data received from the one or more controllers. In this case, the control section 221 is advantageously adapted to control the data transfer interface 226 to send the one or more overload messages to the one or more controllers in response to the overload situation.

Figure 3:
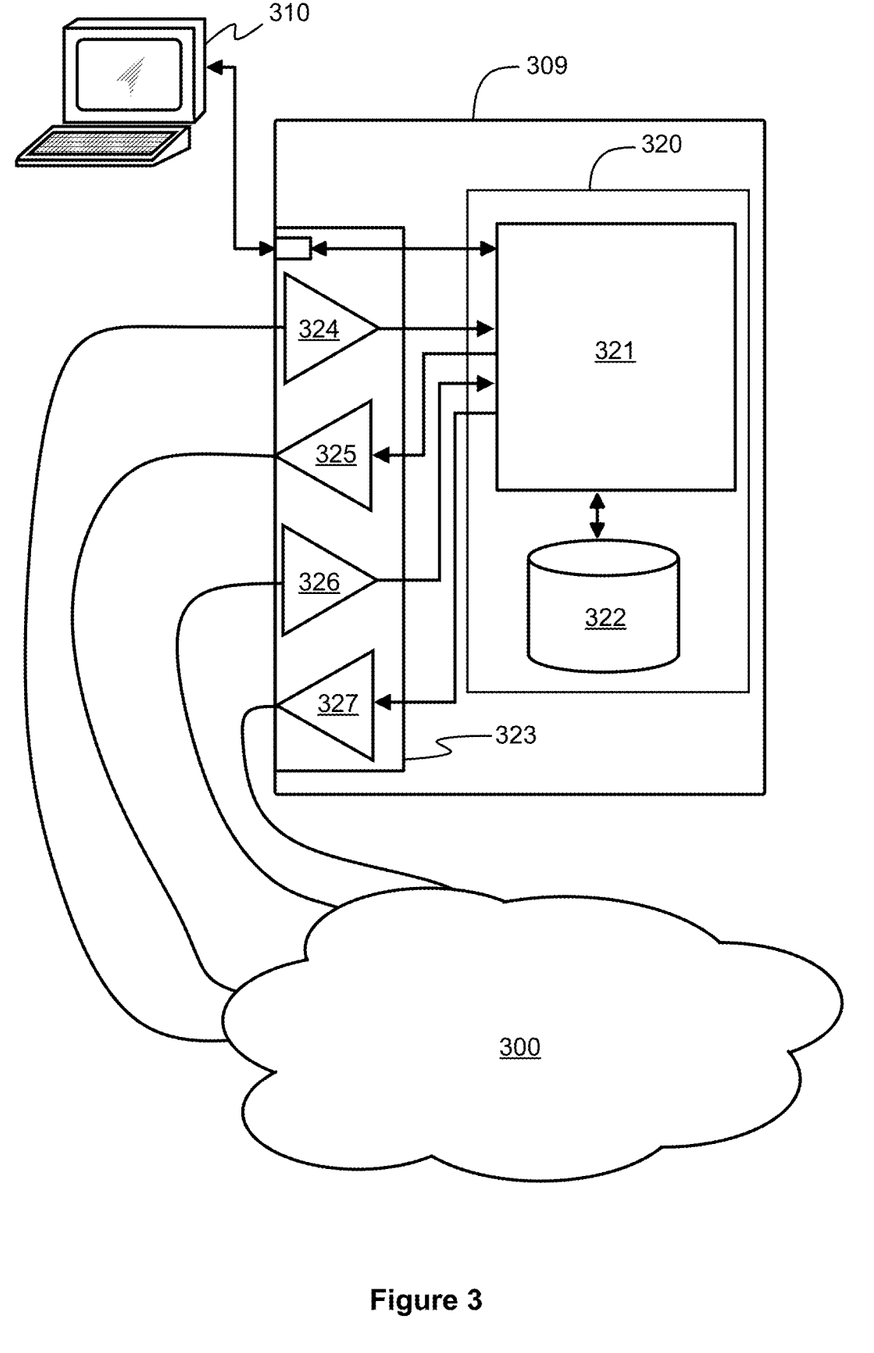
FIG. 3 shows a schematic illustration of a controller according to an exemplifying and non-limiting embodiment of the invention for configuring network elements of a data transfer network.

FIG. 3 shows a schematic illustration of a controller 309 according to an exemplifying and non-limiting embodiment of the invention for configuring network elements of a software-defined network 300. The network elements to be configured are not shown in FIG. 3. In the exemplifying case illustrated in FIG. 3, the controller 309 is a single apparatus but, as mentioned earlier in this document, the controller could as well be a combination of a plurality of apparatuses. The controller 309 comprises a processing system 321 and memory 322. The processing system 321 can be implemented with one or more processor circuits, each of which can be a programmable processor circuit provided with appropriate software, a dedicated hardware processor such as for example an application specific integrated circuit "ASIC", or a configurable hardware processor such as for example a field programmable gate array "FPGA". The memory can be implemented with one or more memory devices such as e.g. a random-access-memory "RAM".

The controller 309 comprises a control-plane section 320 for constructing control-plane messages which carry configuration data for the network elements to be configured. The configuration data enables the control section of a network element to configure the data-plane section of the network element. The configured data-plane section enables the network element to manage data to be forwarded by the network element. The controller 309 comprises a data transfer interface 323 for transmitting the control-plane messages to the network elements to be configured. The data transfer interface 323 comprises ingress ports 324 and 326 and egress ports 325 and 327 for connecting via data transfer links to the software-defined network 300. The data transfer interface 323 may further comprise one or more data ports for connecting to a user interface device 310 and/or to other peripheral devices. The control-plane section 320 is implemented with the processing system 321 and the memory 322. The processing system 321 may comprise a central processor unit "CPU" for the control-plane section 320 and one or more other processors, such as e.g. network processors "NP", for controlling the data transfer interface 323. The control-plane section 320 is adapted to carry out one or more pre-determined actions in response to a reception of an overload message from a network element of the software-defined network 300. The objective of the one or more pre-determined actions is to reduce the amount of such control-plane messages which request the control section of the network element to react, e.g. to modify the configuration of the data-plane section of the network element. The above-mentioned one or more pre-determined actions may comprise for example treating the data-plane section of the network element as unchangeable when configuring other network elements. Thus, the routes defined in the data-plane section of the network element are treated as if these routes were static routes. In an exemplifying and no-limiting case, the one or more pre-determined actions comprise dividing a sub-network constituting an IGP-area and comprising the network element into smaller subnetworks constituting separate IGP-areas so as to reduce the number of IGP-neighbors of the network element under consideration.

In a controller according to an exemplifying and non-limiting embodiment of the invention, the control-plane section 320 is adapted to cancel the above-mentioned one or more pre-determined actions in response to a reception of a back-to-normal message from the network element. In a controller according to an exemplifying and non-limiting embodiment of the invention, the control-plane section 320 is adapted to read from the overload message an estimated duration of the overload situation and to cancel the above-mentioned one or more pre-determined actions when the estimated duration of the overload situation has elapsed.

Figure 4:
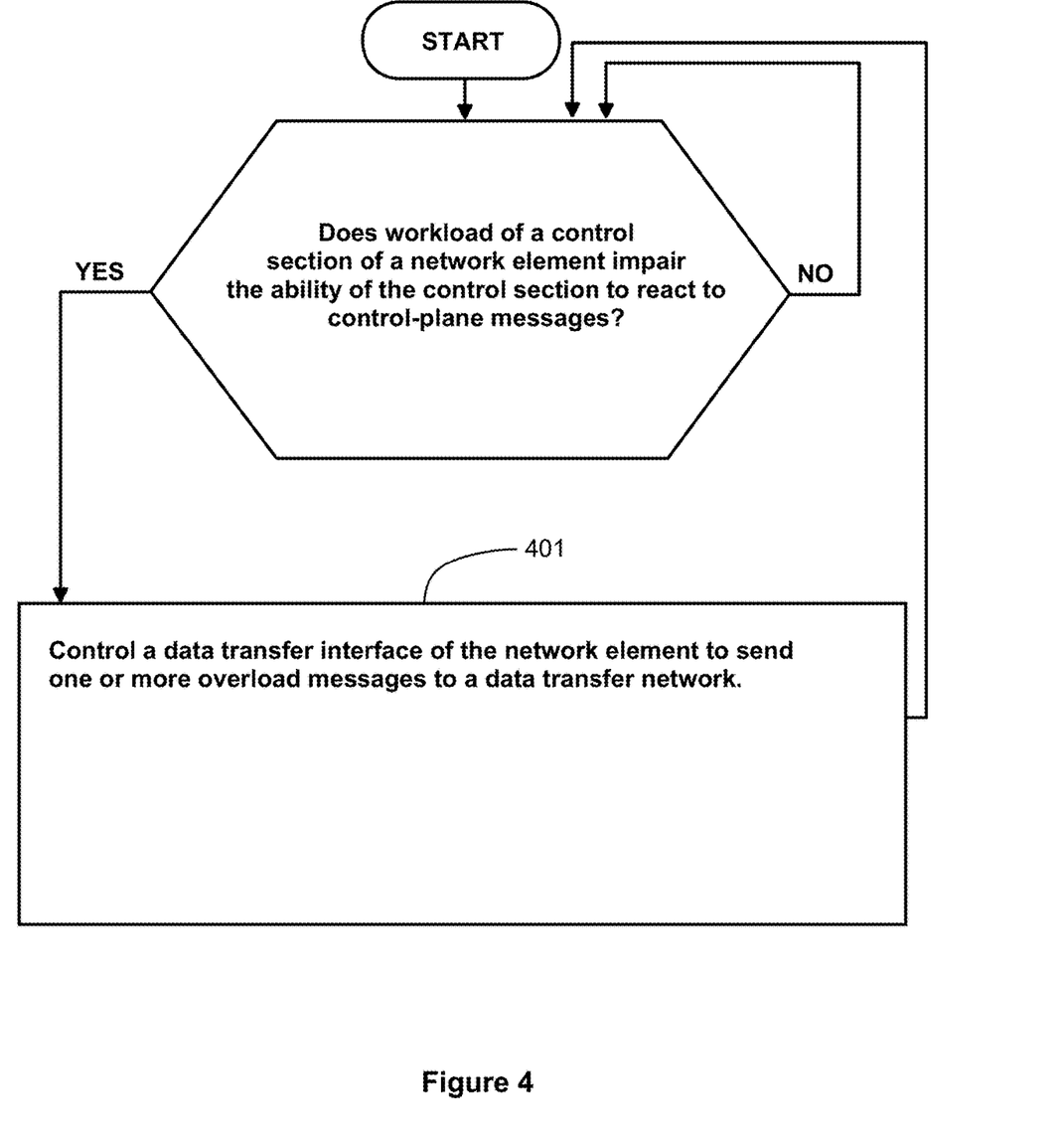
FIG. 4 shows a flowchart of a method according to an exemplifying and non-limiting embodiment of the invention for managing a network element of a data transfer network.

FIG. 4 shows a flowchart of a method according to an exemplifying and non-limiting embodiment of the invention for managing a network element that comprises:

a data transfer interface for connecting to a data transfer network, a data-plane section for managing data to be forwarded, and a control section for configuring the data-plane section in accordance with configuration data carried by control-plane messages received from the data transfer network, the configured data-plane section enabling the network element to operate as a part of the data transfer network.

The method comprises controlling 401 the data transfer interface to send one or more overload messages to the data transfer network in response to an overload situation in which the workload of the control section impairs the ability of the control section to react to the control-plane messages. The ability to react to the control-plane messages can be impaired for example so that the ability to modify the configuration of the data-plane section is impaired, e.g. the ability to modify a routing table, access control lists, and/or other entities related to the data-plane section can be impaired.

A method according to an exemplifying and non-limiting embodiment of the invention comprises controlling the data transfer interface to send one or more back-to-normal messages to the data transfer network in response to ending of the overload situation.

A method according to an exemplifying and non-limiting embodiment of the invention comprises forming, on the basis of tasks to be done by the control section, an estimate for a temporal duration of the overload situation and setting each overload message to carry information indicative of the estimate.

A method according to an exemplifying and non-limiting embodiment of the invention comprises setting each overload message to carry information indicative of one or more reasons of the overload situation. This information may contain for example a first data item expressing that processing capacity of the control section is occupied, a second data item expressing that free memory capacity of the control section is below a pre-determined limit, a third data item identifying one or more tasks being done by the control section and causing the overload situation.

A method according to an exemplifying and non-limiting embodiment of the invention comprises keeping the data-plane section, e.g. a routing table, unchanged during the overload situation.

In a method according to an exemplifying and non-limiting embodiment of the invention, the control-plane messages are routing protocol messages, e.g. OSPF messages, received from one or more other network elements. In this exemplifying case, the method comprises controlling the data transfer interface to send the one or more overload messages to the one or more other network elements in response to the overload situation.

In a method according to an exemplifying and non-limiting embodiment of the invention, the control-plane messages are received from one or more controllers supporting the software-defined networking and the data transfer network is a software-defined network "SDN". In this exemplifying case, the method comprises controlling the data transfer interface to send the one or more overload messages to the one or more controllers in response to the overload situation.

A computer program according to an exemplifying and non-limiting embodiment of the invention comprises computer executable instructions for controlling a programmable processing system to carry out actions related to a method according to any of the above-described exemplifying embodiments of the invention.

A computer program according to an exemplifying and non-limiting embodiment of the invention comprises software modules for managing a network element that comprises:

a data transfer interface for connecting to a data transfer network, a data-plane section for managing data to be forwarded, and a control section for configuring the data-plane section in accordance with configuration data carried by control-plane messages received from the data transfer network, the configured data-plane section enabling the network element to operate as a part of the data transfer network.

The software modules comprise computer executable instructions for controlling a programmable processing system of the network element to control the data transfer interface of the network element to send one or more overload messages to the data transfer network in response to an overload situation in which the workload of the control section of the network element impairs the ability of the control section to react to control-plane messages.

The software modules can be e.g. subroutines or functions implemented with a suitable programming language and with a compiler suitable for the programming language and for the programmable processing system under consideration. It is worth noting that also a source code corresponding to a suitable programming language represents the computer executable software modules because the source code contains the information needed for controlling the programmable processing system to carry out the above-presented actions and compiling changes only the format of the information. Furthermore, it is also possible that the programmable processing system is provided with an interpreter so that a source code implemented with a suitable programming language does not need to be compiled prior to running.

A computer program product according to an exemplifying and non-limiting embodiment of the invention comprises a computer readable medium, e.g. a compact disc "CD", encoded with a computer program according to an exemplifying embodiment of invention.

A signal according to an exemplifying and non-limiting embodiment of the invention is encoded to carry information defining a computer program according to an exemplifying embodiment of invention.

The specific examples provided in the description given above should not be construed as limiting the scope and/or the applicability of the appended claims. Lists and groups of examples provided in the description given above are not exhaustive unless otherwise explicitly stated.

What is claimed is:
1. A network element, comprising:
a data transfer interface configured to connect to a data transfer network,
a data-plane section for managing data to be forwarded by the network element, and a control section for configuring the data-plane section based on configuration data carried by control-plane messages received from the data transfer network, the configured data-plane section enabling the network element to operate as a part of the data transfer network, wherein the control section is configured to control the data transfer interface to send one or more overload messages to the data transfer network in response to an overload situation in which a workload of the control section impairs an ability of the control section to react at least in part to the control-plane messages, the one or more overload messages providing:

an indication that the data-plane section is operational to forward data notwithstanding the overload situation, and information indicative of an estimate for a temporal duration of the overload situation.

2. A network element according to claim 1, wherein the control section is adapted to control the data transfer interface to send the one or more overload messages in response to a situation in which the workload of the control section impairs an ability of the control section to modify a configuration of the data-plane section in accordance with the configuration data.

3. A network element according to claim 1, wherein the control section is adapted to set each overload message to carry information indicative of one or more reasons for the overload situation.

4. A network element according to claim 3, wherein the information indicative of the one or more reasons contains at least one of the following:

a first data item expressing that a processing capacity of the control section is occupied, a second data item expressing that a free memory capacity of the control section is below a pre-determined limit, a third data item identifying one or more control section tasks causing the overload situation.

5. A network element according to claim 1, wherein the control section is adapted to keep the data-plane section unchanged during the overload situation.

6. A network element according to claim 1, wherein the control section is adapted to:

run one or more routing protocols with one or more other network elements, and configure the data-plane section in accordance with routing protocol messages, representing the configuration data, and received from the one or more other network elements.

7. A network element according to claim 6, wherein the control section is adapted to control the data transfer interface to send the one or more overload messages to the one or more other network elements in response to the overload situation.

8. A network element according to claim 1, wherein the control section is adapted to:

run, with one or more controllers, a configuration protocol supporting software-defined networking where a control plane is implemented with the one or more controllers, and configure the data-plane section in accordance with the configuration data received from the one or more controllers.

9. A network element according to claim 8, wherein the control section is adapted to control the data transfer interface to send the one or more overload messages to the one or more controllers in response to the overload situation.

10. A network element according to claim 1, wherein the network element is at least one of the following: an Internet Protocol (IP) router, a MultiProtocol Label Switching (MPLS) switch, a packet optical switch, an Ethernet switch.

11. A controller for configuring network elements of a data transfer network, the controller comprising:

a processing system and memory configured to establish a control-plane section for composing control-plane messages carrying configuration data enabling a control section of each of the network elements to configure a data-plane section of the respective network element, the configured data-plane section enabling the respective network element to manage data to be forwarded by the respective network element, and a data transfer interface for transmitting the control-plane messages to the network elements, wherein the control-plane section is adapted to carry out, in response to a reception of an overload message from one of the network elements, one or more pre-determined actions for reducing an amount of the control-plane messages which request the control section of the one of the network elements to modify a configuration of the data-plane section of the one of the network elements, and wherein the overload message provides:

an indication that the data-plane section of the one of the network elements is operational to forward data notwithstanding an overload situation in which a workload of a control section of the one of the network elements impairs an ability of the control section of the one of the network elements to react at least in part to the control-plane messages, and information indicative of an estimate for a temporal duration of the overload situation, wherein the control-plane section is adapted to cancel the one or more pre-determined actions in response to at least one of:

an elapse of a period of time based at least in part on the estimate, a reception of a back-to-normal message from the one of the network elements.

12. A controller according to claim 11, wherein the one or more pre-determined actions comprise treating the data-plane section of the one of the network elements as unchangeable when configuring other ones of the network elements.

13. A controller according to claim 11, wherein the one or more pre-determined actions comprise dividing a sub network, constituting an interior gateway protocol area and comprising the one of the network elements, into smaller subnetworks constituting separate interior gateway protocol areas.

14. A method for managing a network element that includes each of a data transfer interface for connecting to a data transfer network, and a processing system and memory configured to establish:

a data-plane section for managing data to be forwarded by the network element, and a control section for configuring the data-plane section in accordance with configuration data carried by control-plane messages received from the data transfer network, the configured data-plane section enabling the network element to operate as a part of the data transfer network, the method comprising:

identifying an overload situation in which a workload of the control section impairs an ability of the control section to react at least in part to the control-plane messages;

controlling the data transfer interface to send one or more overload messages to the data transfer network in response to the overload situation, the one or more overload messages providing:

an indication that the data-plane section is operational to forward data notwithstanding the overload situation; and information indicative of an estimate for a temporal duration of the overload situation.

15. A method according to claim 14, wherein the data transfer interface is controlled to send the one or more overload messages in response to a situation in which the workload of the control section impairs an ability of the control section to modify a configuration of the data-plane section.

16. A method according to claim 14, wherein the method comprises setting each overload message to carry information indicative of one or more reasons for the overload situation.

17. A method according to claim 16, wherein the information indicative of the one or more reasons contains at least one of the following:

a first data item expressing that a processing capacity of the control section is occupied, a second data item expressing that a free memory capacity of the control section is below a pre-determined limit, a third data item identifying one or more control section tasks causing the overload situation.

18. A method according to claim 14, wherein the method comprises keeping the data-plane section unchanged during the overload situation.

19. A method according to claim 14, wherein the control-plane messages are routing protocol messages received from one or more other network elements, and wherein the method further comprises controlling the data transfer interface to send the one or more overload messages to the one or more other network elements in response to the overload situation.

20. A method according to claim 14, wherein the control-plane messages are received from one or more controllers supporting software-defined networking where a control plane is implemented with the one or more controllers, and the method comprises controlling the data transfer interface to send the one or more overload messages to the one or more controllers in response to the overload situation.

21. A non-transitory computer readable medium encoded with a computer program for managing a network element that includes a data transfer interface for connecting to a data transfer network, and a processing system and memory, configured to establish:

a data-plane section for managing data to be forwarded by the network element, and a control section for configuring the data-plane section in accordance with configuration data carried by control-plane messages received from the data transfer network, the configured data-plane section enabling the network element to operate as a part of the data transfer network, the computer program comprising computer executable instructions that, upon execution by a programmable processor of the processing system of the network element, causes the network element to:

identify an overload situation in which a workload of the control section impairs an ability of the control section to react at least in part to the control-plane messages;

control the data transfer interface to send one or more overload messages to the data transfer network in response to the overload situation, the one or more overload messages providing:

an indication that the data-plane section is operational to forward data notwithstanding the overload situation; and information indicative of an estimate for a temporal duration of the overload situation.

22. A controller for configuring network elements of a data transfer network, the controller comprising:

a processing system and memory configured to constitute a control-plane section for composing control-plane messages carrying configuration data enabling a control section of each of the network elements to configure a data-plane section of the respective network element, the configured data-plane section enabling the respective network element to manage data to be forwarded by the respective network element, and a data transfer interface for transmitting the control-plane messages to the network elements, wherein the control-plane section is adapted to carry out, in response to a reception of an overload message from one of the network elements, one or more pre-determined actions for reducing an amount of the control-plane messages which request the control section of the one of the network elements to modify a configuration of the data-plane section of the one of the network elements, and wherein the control-plane section is adapted to cancel the one or more pre-determined actions in response to at least one of:

an elapse of a period of time, the period of time being based at least in part on information provided by the overload message indicative of an estimate for a temporal duration of an overload situation in which a workload of the control section of the one of the network elements impairs an ability of the control section of the one of the network elements to react at least in part to the control-plane messages, a reception of a back-to-normal message from the one of the network elements, and wherein the one or more pre-determined actions comprise dividing a sub network, constituting an interior gateway protocol area and comprising the one of the network elements, into smaller subnetworks constituting separate interior gateway protocol areas.

23. A controller for configuring network elements of a data transfer network, the controller comprising:

a processing system and memory configured to constitute a control-plane section for composing control-plane messages carrying configuration data enabling a control section of each of the network elements to configure a data-plane section of the respective network element, the configured data-plane section enabling the respective network element to manage data to be forwarded by the respective network element, and a data transfer interface for transmitting the control-plane messages to the network elements, wherein the control-plane section is adapted to carry out, in response to a reception of an overload message from one of the network elements, one or more pre-determined actions for reducing an amount of the control-plane messages which request the control section of the one of the network elements to modify a configuration of the data-plane section of the one of the network elements, and wherein the overload message provides an indication that the one of the network elements is operational to forward data notwithstanding an overload situation in which a workload of the control section of the one of the network elements impairs an ability of the control section of the one of the network elements to react at least in part to the control-plane messages, wherein the control-plane section is adapted to cancel the one or more pre-determined actions in response to at least one of:

an elapse of a period of time that is based at least in part on information provided by the overload message indicative of an estimate for a temporal duration of the overload situation, a reception of a back-to-normal message from the one of the network elements, the back-to-normal message providing an indication that the one of the network elements is working normally again, and wherein the one or more pre-determined actions comprise dividing a sub network constituting an interior gateway protocol area and comprising the one of the network elements into smaller subnetworks constituting separate interior gateway protocol areas.

\* \* \* \* \*